United States Patent [19]

Sano et al.

[11] Patent Number: 5,141,209
[45] Date of Patent: Aug. 25, 1992

[54] TRANSVERSE LEAF SPRING TYPE SUSPENSION

[75] Inventors: Shoichi Sano, Tokyo; Masami Ogura; Hajime Kajiwara, both of Saitama; Yasuhiko Fujita, Tokyo, all of Japan

[73] Assignee: Honda Giken Kogyo Kabushiki Kaisha, Tokyo, Japan

[21] Appl. No.: 494,454

[22] Filed: Mar. 16, 1990

Related U.S. Application Data

[63] Continuation-in-part of Ser. No. 278,240, Nov. 30, 1988, abandoned.

[30] Foreign Application Priority Data

Dec. 1, 1987 [JP] Japan ................. 62-303598

[51] Int. Cl.⁵ ............................................. B60G 3/28
[52] U.S. Cl. .............................. 267/36.1; 267/260; 280/719
[58] Field of Search ............ 267/36.1, 40, 44, 52, 267/45, 46, 47, 158, 39; 280/719, 718

[56] References Cited

U.S. PATENT DOCUMENTS

| | | | |
|---|---|---|---|
| 1,762,407 | 6/1930 | Mogford et al. | 267/52 |
| 1,975,836 | 10/1934 | Ford | 280/719 |
| 2,458,548 | 1/1949 | Aronson | 280/719 |
| 2,641,482 | 6/1953 | Wilfert | 280/719 |
| 2,697,613 | 12/1954 | Giacosa | 280/719 |
| 4,613,152 | 9/1986 | Booher | 280/669 |
| 4,619,466 | 10/1986 | Schaible et al. | 267/52 |
| 4,725,074 | 2/1988 | Stevens | 267/36.1 |
| 4,771,997 | 9/1988 | Haldenwanger et al. | 267/260 |
| 4,887,841 | 12/1989 | Cowburn et al. | 267/36.1 X |

FOREIGN PATENT DOCUMENTS

| | | |
|---|---|---|
| 0189241 | 7/1986 | European Pat. Off. . |
| 0243102 | 10/1987 | European Pat. Off. . |
| 501626 | 9/1983 | Japan . |

Primary Examiner—Matthew C. Graham
Attorney, Agent, or Firm—Lyon & Lyon

[57] ABSTRACT

Disclosed is a suspension having an improved transverse leaf spring with its longitudinal axis extending transversely of a car body. The leaf spring is operatively associated at opposite ends with the right and left wheels of a car and is curved along its intermediate length in the direction in which the car moves ahead or back. The curved portion may be along a full length of the leaf spring or along a length defines between support points on the leaf spring, and in the latter case, lengths extending from the respective support points to the ends of the leaf spring most adjacent thereto remain linear to form linear portions extending substantially perpendicularly with respect to respective suspension arm rocking shafts. Various forms of support elements are described for securing the leaf spring for only pivotal movement about one of the support points and both pivotal and linear movement about the other thereof.

5 Claims, 5 Drawing Sheets

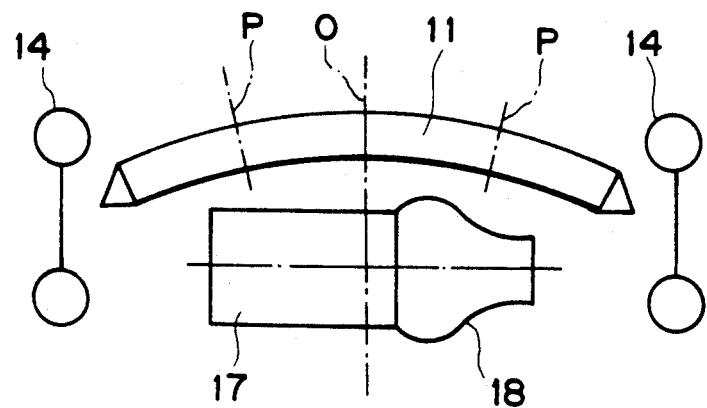
F I G. 1
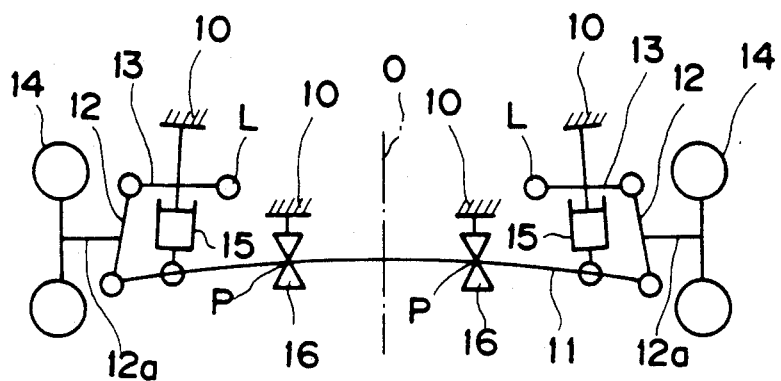
F I G. 2
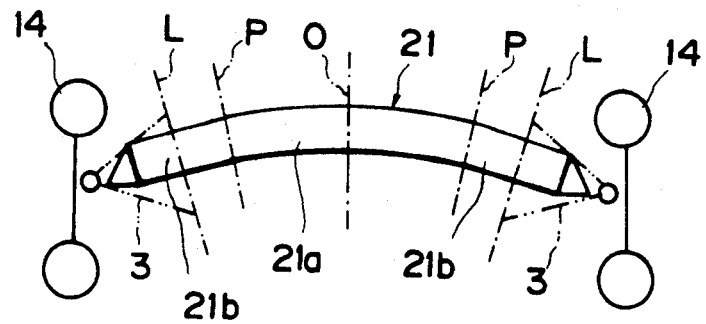
F I G. 3

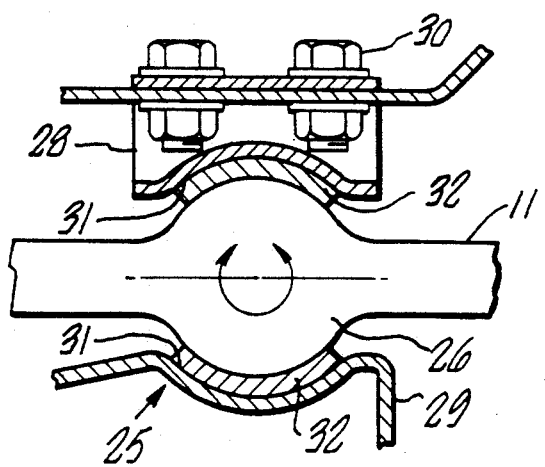
F I G. 9.
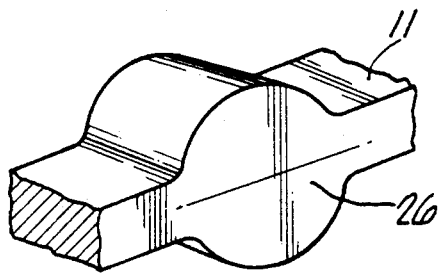
F I G. 10
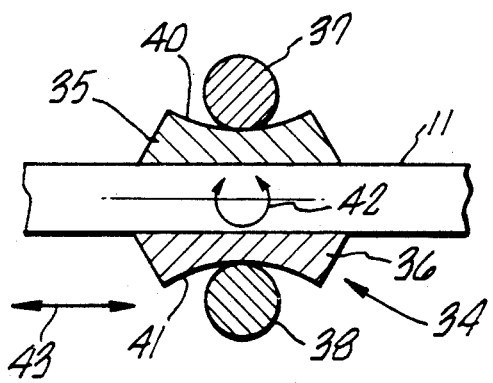
F I G. 11.
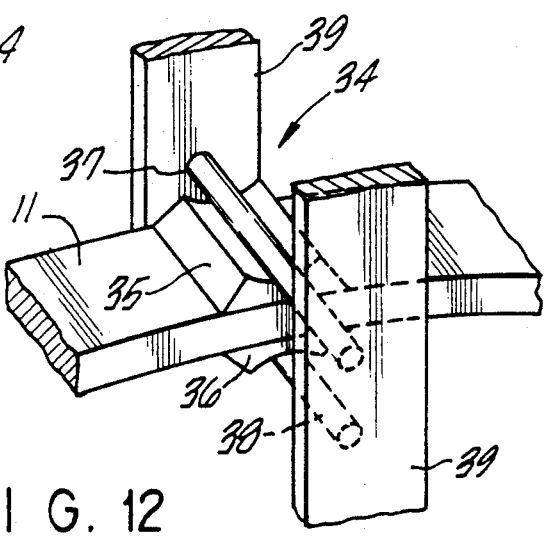
F I G. 12

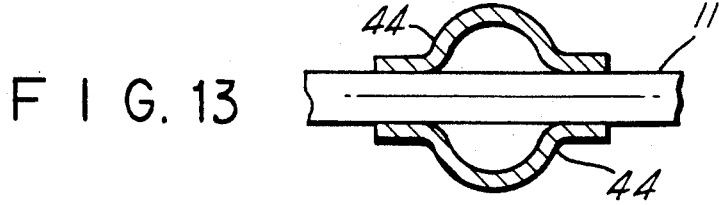
FIG. 13
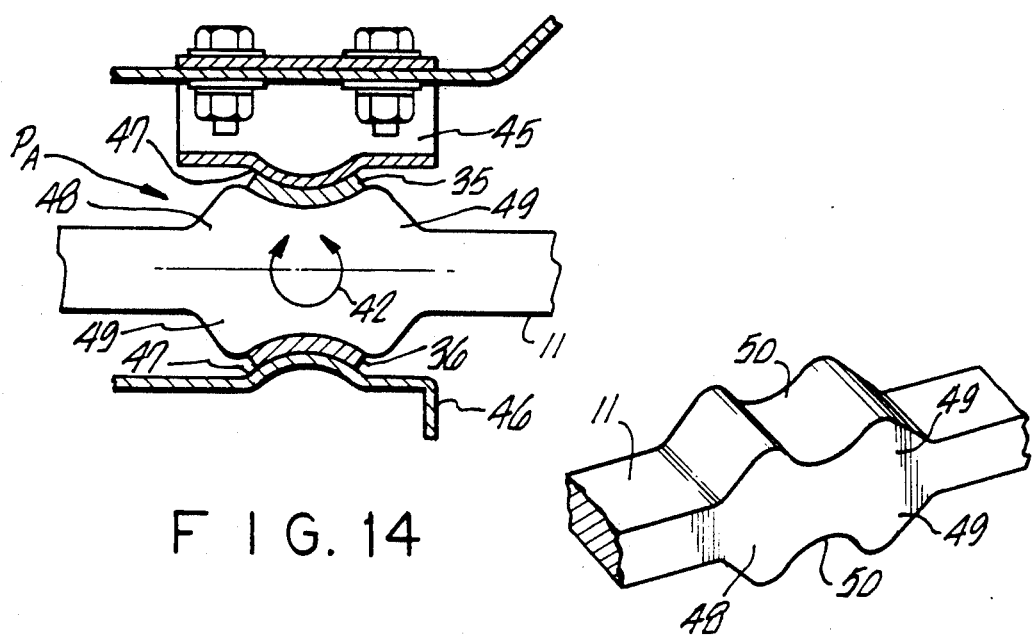
FIG. 14
FIG. 15.
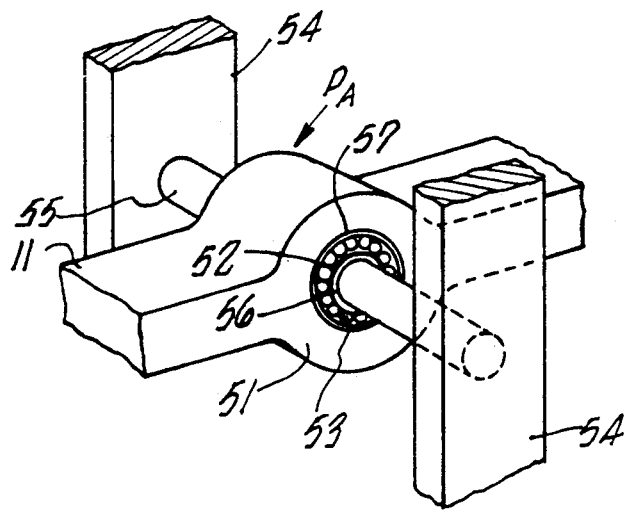
FIG. 16

TRANSVERSE LEAF SPRING TYPE SUSPENSION

RELATED APPLICATION

This application is a continuation-in-part application from U.S. patent application Ser. No. 278,240, filed Nov. 30, 1988, now abandoned.

FIELD OF THE INVENTION

This invention relates to a transverse leaf spring-type suspension for an automobile.

BACKGROUND OF THE INVENTION

A transverse leaf spring type suspension including a leaf spring mounted transversely of a car body so as to serve also as a lower arm or upper arm is disclosed, for example, in Japanese Disclosure Gazette No. 1983-501626 (International Publication No. WO 83/01758). The suspension of this type can do away with both the coil spring and the stabilizer.

FIG. 4 of the accompanying drawing schematically shows the leaf spring 1 included in the conventional suspension of this type in which the leaf spring 1 serves also as the lower arm, and the wheels 2. The wheels 2 are operatively associated by the respective knuckles with the opposite ends of the leaf spring 1. This leaf spring 1 has a linear longitudinal axis perpendicular to the central axis 0 of the car body and is supported by the car body at two intermediate support points P.

However, it will be impossible to mount the leaf spring 1 linearly between the right and left wheels 2 when various components such as the engine, the transmission, the differential gear and an axle beam are positioned between these wheels 2.

FIG. 5 illustrates a relationship between the upper arms 3 and the associated wheels 2. To obtain a suspension geometry for high maneuverability and stability, each rocking shaft L of the associated suspension arm, such as the upper arm 3, makes an angle with the central axis 0 of the car body. When the linear leaf spring 1 is employed in such suspension, the axis of the leaf spring 1 will not be perpendicular to the rocking shafts L, causing a torsional moment to be exerted on the leaf spring 1 at its support points as the wheels 2 move vertically. To achieve a lightweight vehicle, the leaf spring 1 may be formed by use of suitable synthetic resin, such as fiberglass reinforced plastic (FRP), but a leaf spring 1 made of such material will not be adequately resistant to the torsional moment and, therefore, the linear leaf spring 1 will be inadequate in this case.

SUMMARY OF THE INVENTION

In view of these problems, a primary object of this invention is to provide a transverse leaf spring type suspension adapted to be mounted between the right and left wheels even when the car components, such as the engine, are present between the wheels.

Another object of this invention is to provide a leaf spring type suspension having a leaf spring adapted to be free from any significant torsional moment produced due to a vertical movement or other movements of the wheels when the leaf spring is made of material that is unable to provide adequate resistance to such torsional moment.

The objects set forth above are achieved, in accordance with this invention, by a suspension having a transverse leaf spring which has its longitudinal axis extending transversely of the car body, with opposite ends of which the right and left wheels are operatively associated, and which is supported at its longitudinally intermediate points by the car body, characterized in that the leaf spring is curved in the direction in which the car moves ahead or rearwardly.

Such objects are also achieved, particularly when the leaf spring is made of material that may be unable to provide adequate resistance to a torsional moment, according to this invention, by a suspension having a transverse leaf spring which has its longitudinal axis extending transversely of a car body, with opposite ends of which the right and left wheels are operatively associated, and which is supported at two or more intermediate points along its length by the car body, characterized in that said leaf spring comprises nonlinear or curved portions defined between the support points and curved in the direction in which the car moves ahead or rearwardly and linear portions extending from the outermost support points to the respective adjacent ends.

This invention permits the engine to be disposed adjacent the curved portions.

Furthermore, the aforementioned linear portions may be oriented so as to extend substantially perpendicularly with respect to the associated rocking axis of the suspension arms in order that these linear portions are rocked around the respective support points with the consequence that the torsional moment that may be exerted on these support points is reduced to the minimum level.

Elasticity of the leaf spring forming a part of the suspension reduces the amount of vibration of the car during its running from being transmitted to the car body and elements forming the support points between the leaf spring and the car body are particularly designed to enhance this characteristic.

BRIEF DESCRIPTION OF THE DRAWINGS

The transverse leaf spring type suspension of the invention, as used with the front wheels of a front engine-front drive (FF) car and having the leaf spring serving also as the lower arm, is illustrated, by way of example, in the accompanying drawings in which:

FIG. 1. is a plan view schematically illustrating a relationship between a curved leaf spring and car components, such as wheels and an engine;

FIG. 2 is a schematic front view corresponding to FIG. 1;

FIG. 3 is a plan view similar to FIG. 1, illustrating a transverse leaf spring comprising curved portions and linear portions;

FIG. 9 is a view, partly in section, illustrating one element of the support arrangement of FIG. 8 in greater detail;

FIG. 10 is a partial perspective view illustrating the configuration of the spring member operative in the support element of FIG. 9;

FIG. 11 is a view, partly in section, illustrating the other element of the support arrangement of FIG. 8 in greater detail;

FIG. 12 is a partial perspective view of the support element of FIG. 11;

FIG. 13 is a view, partly in section, illustrating a modified embodiment of the support element of FIG. 9;

FIG. 14 is a view, partly in section, illustrating another modified embodiment of the support element of FIG. 9;

FIG. 15 is a partial perspective view of the support element of FIG. 14; and

FIG. 16 is a partial perspective view of yet another embodiment of the support element of FIG. 9.

DESCRIPTION OF THE PREFERRED EMBODIMENTS

Figure 4:
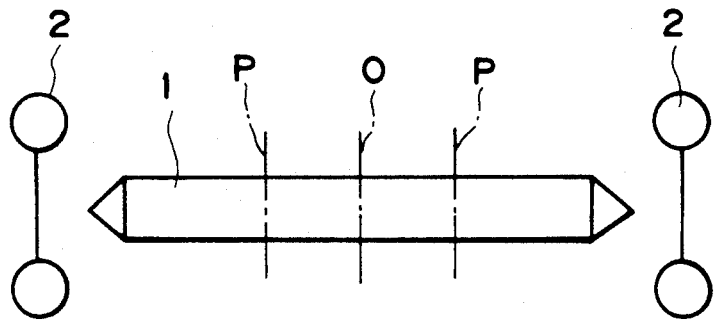
FIG. 4 is a plan view schematically illustrating the transverse leaf spring type suspension of the prior art.
Figure 5:
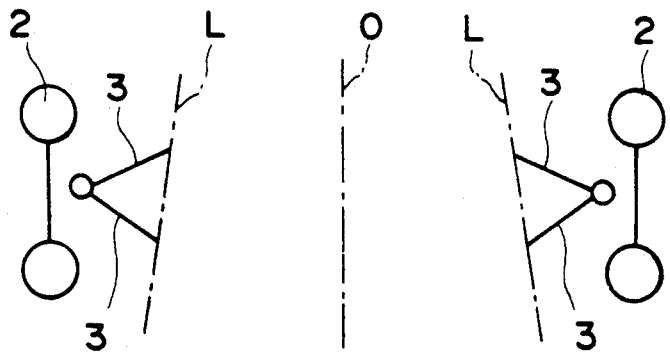
FIG. 5 is a plan view schematically illustrating a relationship between respective upper arm rocking shafts and the central axis of a car body.

The transverse leaf spring type suspension constructed in accordance with the present invention will be described generally, by way of example, with reference to FIGS. 1 through 3 of the accompany drawings.

Referring to FIG. 2, which is a front view, the suspension is schematically illustrated as being mounted in association with the front wheels of a FF car. It includes a leaf spring 11 having its longitudinal axis extending transversely of the car body 10. The leaf spring 11 serves as a lower arm and lower ends of the respective knuckles 12 which are operatively connected with opposite ends of the leaf spring 11 through means such as ball joints. Upper arms 13 are supported by associated rocking shafts L mounted for rocking movement with respect to the car body 10 and pivotally connected at ends remote from the respective rocking shafts L to the upper ends of the respective knuckles 12. Knuckle shafts 12a rotatably support the respective wheels 14. There are provided adjacent the opposite ends of the leaf spring 11 strut dampers 15 the upper ends of which support the car body 10. The leaf spring 11 is supported at two intermediate points P along its length on the car body 10 by the interposition of associated rubber mounts 16 or by support elements described in detail hereinafter. Reference symbol 0 designates the central axis of the car body.

As seen in FIG. 1, which is a schematic plan view, the leaf spring 11 is curved in the direction of the longitudinal axis of the car so that an engine 17 and a transmission 18 may be disposed in the space provided by this curved portion.

Figure 7:
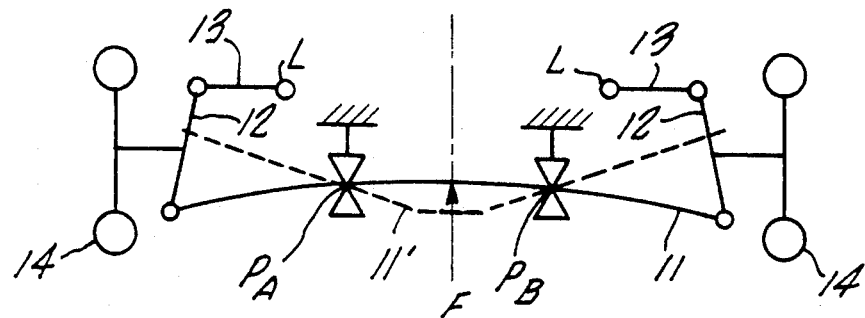
FIG. 7 is a view, similar to FIG. 2, illustrating deflection of the spring as the wheels move vertically.

The suspension shown by FIGS. 1 and 2 operates in the manner described hereinafter. Referring to FIG. 7, vertical movement of the wheels causes the respective upper arms 13 to be rocked around the associated rocking shafts L. Simultaneously, the portions of the leaf spring 11 extending from the respective support points indicated as $P_A$ and $P_B$ to the adjacent ends pivot with respect to the associated support points as the spring deflects in the manner indicated by the broken line 11'. Thus, the elasticity of the leaf spring 11 allows such vertical movement of the wheels 14 relative to the car body 10 while minimizing the transmission of vibration to the car body 10.

Such car components as the engine 17 and the transmission 18 can be located in the space provided by the curved portion of the leaf spring 11. Consequently, a suspension having the transversely curved leaf spring 11 of the invention can be employed even when components such as an engine 17 are present between the right and left wheels 14.

FIG. 3 is a plan view similar to FIG. 1 and schematically illustrates a leaf spring 21 having a configuration, which is preferable, particularly when the leaf spring 21 is made of a material that is unable to provide an adequate resistance to a possible torsional moment. The leaf spring 21 of this suspension is provided with right and left support points P and has a portion extending between these support points P that is curved in the direction in which the car moves rearwardly to form a curved portion 21a. Portions extending from the respective support points P to the adjacent ends of the leaf spring 21 each form linear portions 21b having orientations defined respectively by tangent lines extending from the respective support points P of said curved portion 21a. These linear portions 21b extend toward the associated wheels 14 substantially perpendicularly with respect to the respective rocking shafts L of the upper arms 13, each of the rocking shafts L making an angle with respect to the central axis 0 of the car. The wheels 14 are operatively associated with the spring 21 in the same manner as has previously been mentioned with respect to spring 11, with the outer ends of the respective linear portions 21b attaching the knuckles 12.

With particular reference to FIG. 7 the described suspension operates as follows. As the wheels 14 move vertically the upper arms 13 are caused to pivot due to the action of the rocking shafts L in their mounts. Simultaneously therewith the leaf spring 11 deflects under the influence of the force F, as indicated by the broken line 11', so that the ends of the leaf spring are rocked about the respective support points, here designated as $P_A$ and $P_B$, respectively. In this way the transmission of vibration to the car body is substantially avoided.

Figure 8:
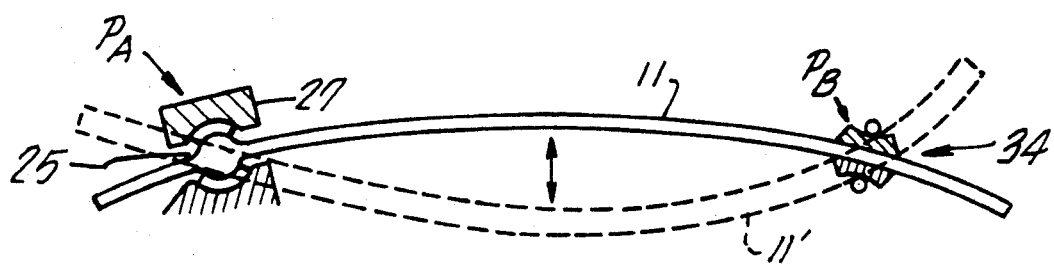
FIG. 8 is a view illustrating a typical support arrangement capable of use in practice of the present invention.

In the practice of the disclosed invention the support points $P_A$ and $P_B$ are preferably defined by support elements that are particularly configured to control the form of movement undergone by the leaf spring 11. For example, as shown in FIG. 8 the support point indicated as $P_A$ comprises a supporting arrangement within which movement of the spring 11 is substantially restricted to pivotal movement. Support point $P_B$, on the other hand, as shown in FIG. 11 is structured so that the leaf spring can move both pivotally and linearly in the direction of its longitudinal axis. Thus, the support element providing support at point $P_A$ and designated generally by the reference numeral 25 in FIGS. 9 and 10 comprises a generally cylindrical body portion 26 integrally formed on the leaf spring 11 with its axis of revolution extending substantially perpendicularly of the longitudinal axis of the spring. The body portion 26 is received in a mount 27 which, as shown in FIG. 9, may be formed by metal bracket members 28 and 29 which are attached to the car body, as for example, by threaded connectors 30. The bracket members 28 and 29 are each provided with an arcuate recess 31 to which is bonded by adhesive, or the like, a resilient pad 32 for receiving the spring body portion 26 in a manner to restrict its movement to a pivotal movement as indicated by the arrow 33. The resilient pad 32 is preferably formed of a hard rubber or of equivalent vibration-damping material.

The support element intended for use at support point $P_B$ is indicated generally as 34 in FIGS. 11 and 12. This element comprises a pair of resilient pads 35 and 36 joined, as by means of adhesive bonding, to opposite surfaces of the leaf spring 11 and extending transversely of the longitudinal axis thereof. These pads 35 and 36, which are formed of hard rubber or equivalent material are retained between a pair of support rods 37 and 38 that extend between and are rigidly fixed to suspension brackets 39. As shown in the drawing figures the surfaces 40 and 41 of the pads 35 and 36 engaged by the support rods 37 and 38 are arcuately formed of a radius that is substantially greater than the radius of the respective support rods. Consequently, at this support point, $P_B$, the leaf spring can readily accommodate both pivotal movement, indicated by the arrow 42 and linear movement, indicated by the arrow 43, parallel to the longitudinal axis of the spring.

The support point designated $P_A$, can be effectively formed by alternate structural arrangements that essentially restrict movement of the spring 11 to pivotal movement. Thus, in FIG. 13 the integrally formed body portion 26 of FIGS. 9 and 10 is replaced by a pair of convexly formed metal members 44 joined by welding, or the like, to opposite surfaces of the spring 11. As shown, the members 44 cooperate to form a body portion adapted to be received between recessed brackets containing resilient mounting pads similar to those shown in FIG. 9.

FIG. 14 illustrates another embodiment of support element suitable for use at support point $P_A$. In this embodiment the mounting brackets, indicated as 45 and 46, are provided with convex bearing surfaces 47 to which resilient pads 35 and 36 are attached. The leaf spring 11, on the other hand, is formed with an integral body portion 48 defined by projections 49 extending from opposite sides of the spring and containing arcuately formed concave recess surfaces 50 adapted to receive the convex bearing surfaces 47 of the respective mounts with the interposed resilient pads 35 and 36.

Yet another embodiment of support element suitable for use at support point $P_A$ is shown in FIG. 16. In this embodiment the spring 11 is provided with an integrally formed body portion 51 containing a transverse bore 52 for reception of a bearing member, such as roller bearing 53. In this embodiment of the invention the support point $P_A$ includes a pair of oppositely spaced brackets 54 that are secured to the car body. An axle rod 55 extends between, and has its ends fixed to, the brackets 54. As shown, the bearing inner race 56 is secured to the axle rod 55 with the outer race 57 being secured to the surface of the bore 52.

As shown in FIG. 1, where the leaf spring 11 possesses portions extending outwardly from the respective support points P to the adjacent ends which are also curved, these portions are not perpendicular to the rocking shafts L of the associated upper arms 13 but have their orientations varying point to point. Consequently, the direction of the force exerted on each point along said portions varies as the wheels 14 move vertically, producing a high torsional moment exerted on the support points P. Accordingly, the leaf spring 11 of this configuration is undesirable in regard to the strength required to resist such high torsional moment and, when the leaf spring 11 is made of a synthetic resin, such as FRP, adequate durability cannot be expected.

On the other hand, if the linear portions 21b are made to extend substantially perpendicularly with respect to the associated rocking shafts L, as in the leaf spring 21 shown by FIG. 3, the torsional moment, which may be exerted on each of said linear portions 21b, will be of a substantially lower value than that exerted on the corresponding portion which is curved. Accordingly, the leaf spring 21 may be made of FRP, or other synthetic resin.

Figure 6:
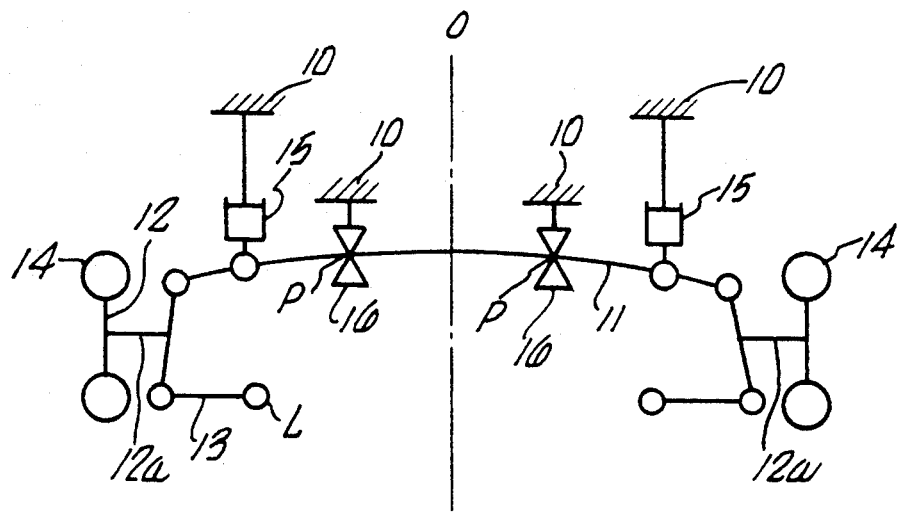
FIG. 6 is a view similar to FIG. 1 illustrating a first modified embodiment of the invention.

Although the described embodiments have been illustrated with the leaf spring serving as the lower arm, it is also possible, within the scope of this invention, as shown in FIG. 6, that the leaf spring can serve alternatively as the upper arm, or the leaf spring can be provided separately of the suspension arms. Furthermore, although the embodiment has been discussed above in connection with the front wheels of a FF car, the suspension of this invention may be also mounted on the rear wheels of a front engine-rear drive (FR) car.

As will be apparent from the foregoing description, the transverse leaf spring type suspension constructed in accordance with this invention has the leaf spring so curved as to define a space within which the car components such as the engine and the differential gear can be positioned. Accordingly, the transverse leaf spring of the invention may be adopted even when such car components are present between the right and left wheels. Moreover, when the suspension arms have the rocking shafts each making an angle with respect to the central axis of the car body, the invention allows the leaf spring to extend substantially perpendicularly with respect to these rocking shafts, so that the torsional moment which may be exerted on this leaf spring is smaller than that exerted on a corresponding linear leaf spring of convention design. Consequently, the durability of the leaf spring is thereby improved.

By forming the portions of the leaf spring extending from the respective points at which the leaf spring is supported on the car body to the free ends thereof as linear portions, it is possible to make the leaf spring extend substantially perpendicularly with respect to the respective rocking shafts of the suspension arms. Thereby, the torsional moment exerted on the leaf spring is further reduced from that which would be exerted on the leaf spring that is curved along its full length, and synthetic resin, such as FRP, can be used as a material for such a leaf spring. Such reduction in torsional movement is still further enhanced when movement of the leaf spring is restricted, as by means of the support elements described herein.

Thus, it is possible to provide a light weight leaf spring and, correspondingly, a light weight car. Furthermore, the respective rocking shafts of the suspension arms can be inclined with respect to the central axis of the car body, increasing the degree of freedom for design and achieving the transverse leaf spring type suspension having a suspension geometry more preferable for maneuverability and stability.

It should be further understood that, although a preferred embodiment of the invention has been illustrated and described herein, changes and modifications can be made in the described arrangement without departing from the scope of the appended claims.

We claim:

1. A transverse leaf spring type suspension for a car having an engine supported by a body of sid car comprising a transverse leaf spring operatively associated at opposite ends with right and left wheels of said car, said leaf spring being supported at two intermediate points along its length by said car body, rocking shafts each having a pivot axis extending transversely with respect to the longitudinal axis of said leaf spring for connecting said wheels to said car body, the portion of said leaf spring extending between said two intermediate points being curved in the direction of the longitudinal axis of said car, lengths of said leaf spring from the respective support points to the ends of said leaf spring being linear and each extending substantially perpendicularly with respect to the axis of the adjacent rocker shaft, and support elements at said intermediate points having means at one said intermediate point securing said leaf spring for only pivotal movement and means at the other said intermediate point securing said leaf spring for both pivotal movement and linear movement substantially parallel to the longitudinal axis of said leaf spring, said support element means at said one intermediate point including roller bearing means secured to said leaf spring for rotation about an axis perpendicular to the longitudinal axis of said leaf spring, bracket means attached to said car body, and an axle fixed to said bracket means securing said roller bearing means.

2. A transverse leaf spring type suspension according to 1 in which said support element means at said one intermediate point includes a bore in said leaf spring extending substantially perpendicular to the longitudinal axis of said leaf spring, a roller bearing contained in said bore having its outer race secured to the surface thereof, and its inner race secured to said axle.

3. A transverse leaf spring type suspension according to any one of claims 2 and 1 in which said support element means at said other intermediate point comprises bearing bodies formed on opposite sides of said leaf spring and vertically spaced support rods fixed to said car body for bearing engagement with said leaf spring bodies, said bearing bodies and said support rods having curved external surfaces with those of said support rods being convex and those of said bearing bodies being concave and of greater radius than the surfaces of said support rods.

4. A transverse leaf spring type suspension according to claim 3 in which said leaf spring bearing bodies are formed of resilient material.

5. A transverse leaf spring type suspension for a car having an engine supported by a body of sid car comprising a transverse leaf spring operatively associated at opposite ends with right and left wheels of said car, said leaf spring being supported at two intermediate points along its length by said car body, rocking shafts each having a pivot axis extending transversely with respect to the longitudinal axis of said spring for connecting said wheels to said car body, the portion of said leaf spring extending between said two intermediate points being curved in the direction of the longitudinal axis of said car, lengths of said leaf spring from the respective support points to the ends of said leaf spring being linear and each extending substantially perpendicularly with respect to the axis of the adjacent rocker shaft, and support elements at said intermediate points, said support elements including means at one said intermediate point securing said leaf spring for only pivotal movement and means at the other said intermediate point securing said leaf spring for both pivotal movement and linear movement substantially parallel to the longitudinal axis of said leaf spring, said support means at said one intermediate point including a bore in said leaf spring extending substantially perpendicular to the longitudinal axis of said leaf spring, a roller bearing contained in said bore having its outer race secured to the surface thereof, and its inner race secured to said axle.

* * * * *